United States Patent Office 3,644,326
Patented Feb. 22, 1972

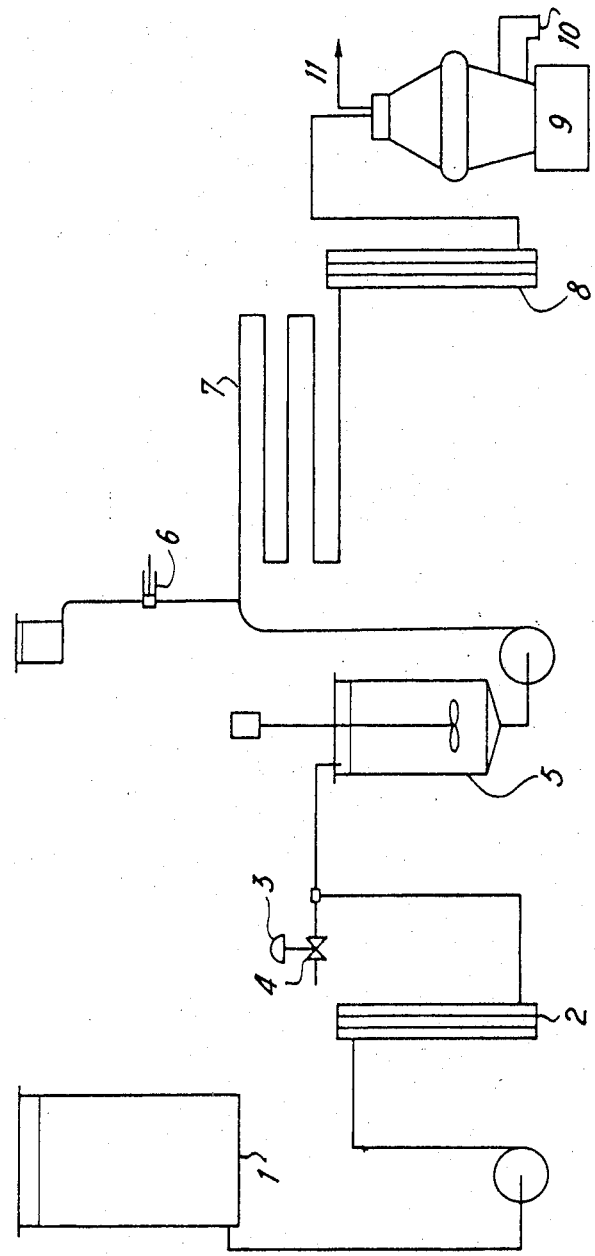

3,644,326
EXTRACTING PROTEINS FROM LACTOSERUM
Jean Lucien Joseph Pien, Paris, France, assignor to Genvrain, Paris, France
Filed Nov. 25, 1968, Ser. No. 778,537
Claims priority, application France, Nov. 30, 1967, 130,410
Int. Cl. A23c *19/02, 21/00;* A23j *1/20*
U.S. Cl. 260—122                                                  11 Claims

ABSTRACT OF THE DISCLOSURE

Proteins in lactoserum are continously extracted by a process involving the steps of adjusting the pH to between 6.2 and 6.4, heating to 90–100° C. for 10 to 30 minutes, acidifying to between pH 4.4 and 4.9 to precipitate the proteins, cooling to 20–60° C. and centrifuging to separate the proteins.

---

The present invention relates to a process for continuously extracting the soluble proteins from lactoserum particularly so that the soluble proteins can be reintroduced into the milk during the manufacture of cheese, as well as to the obtained products.

In the manufacture of cheese, lactoserum is separated from the coagulum formed by the action of rennet on the milk, and this contains certain soluble substances inter alia, proteins which cannot be coagulated by the rennet. These are mainly lactalbumin and lactoglobulin, the concentration of which depends on a number of factors, e.g. the milk used, the season, the nature of the cheese being manufactured, and the pasteurisation temperature of the milk.

Thus usually in the cheese industry, a considerable quantity of these soluble protein materials are lost in the serum. They are completely lost when the milk used is raw milk. However, in those manufacturing processes which use pasteurised milk, they are partially insolubilised, depending on the degree of heating of the milk, at the boundaries of the calcium phosphocaseinate micelles. The coagulation of the casein with rennet causes the retention of the insolubilised albumin and hence results in an increased yield. It has often been the aim of cheese manufacturers to increase their yields by making use of high or very high pasteurisations. However, this can only be done to a very limited extent, because as is well known, heating the milk has an undesirable effect on the physical chemistry of the rennet treatment process. Hence the increase in yield obtained by the previous insolubilisation of the proteins present in the milk is always very low.

It was, therefore, considered that since these albumins remained in solution in the serum, it was necessary to recover them by insolubilising them and separating them so that they could subsequently be reintroduced into milk used for making more cheese.

Various processes have already been proposed for continuously extracting the soluble proteins from the lactoserum.

Certain processes require controlled temperature and pH conditions in the treatment of the serum. For example, U.S. Pat. 3,066,133 describes a process for extracting the proteins from the serum obtained in the manufacture of a certain cheese, using the conditions specified, according to the tables given in this patent, it is possible to extract from the serum about 23.8% of the soluble proteins (albumin) which it contains.

Other processes make use of special agents for the treatment of the serum. For example, U.S. Pat. 3,252,961 explains that conventional methods make it difficult to recover the proteins and proposes to use an extraction process which requires the use of special flocculating agents. These give rise to a particular structure in the insolubilised proteins so that they are obtained in the form of a compact cake.

Such patents show clearly how difficult it is to obtain conditions for treating the lactoserum which make it possible to extract continuously the major portion of the soluble proteins without needing to use special agents and chiefly which provide the extracted proteins in such a form that they can be incorporated into milk for the production of cheese.

Such an incorporation would, however, be of considerable economic importance in the manufacture of cheese. Thus, a volume of milk L containing a volume S of serum is capable of producing a weight of cheese F. However, the weight of cheese F' which could be obtained, starting from the volume L to which has been added the proteins extracted from a volume S of serum, would be higher by 13.5 to 15% than the weight F.

Study of the scientific or technical literature also shows that the efforts made to solve this difficult problem have met with little success. Hence the cheeses obtained were of poor quality, having a disagreeable taste and smell, complete change in the maturing process, etc.

Among the many works which could be mentioned in this context, one is given as an illustrative example; Pulsz, "Kieler Milchwirtschaftliche Forschungsberichte" (1955, page 385). In this the author reviews the problem of using the serum proteins in cheese-making and points out the poor results obtained by various investigators in this field. In all cases, experiments in laboratories or on a semi-industrial scale have led to these very bad results or failures.

The applicant has already described in French Pat. No. 1,453,815 of Jan. 22, 1967 and application No. 57,073 of June 27, 1966 processes which make it possible during a discontinuous manufacturing process, to increase the yield of cheese by insolubilisation of the lactoserum proteins under certain conditions, separation by centrifuging or by other means of the insolubilised proteins and reincorporation of these proteins into the milk used for cheese making.

Since then as the result of much research carried out both on a laboratory scale and on a production scale, the applicant has now discovered that it is possible, by selecting the insolubilisation conditions for the proteins, particularly by providing new operations in the insolubilisation process and by choosing the method used for separation of the insolubilised proteins, to provide a separation process which significantly produces a much better result. In this process the proteins are extracted continuously from the lactoserum, by a succession of well-defined operations. The proteins obtained have outstanding physico-chemical characteristics which make them remarkably suitable for incorporation into milk used for cheesemaking and which give a maximum yield of cheese and a maximum quality of cheese.

According to a first feature of the invention, it is taught to insolubilise the proteins present in the lactoserum by a continuous process in which the following steps are successively carried out: adjusting, if necessary, and maintaining the pH of the lactoserum between 6.2 and 6.4, heating the lactoserum to a temperature between 90° C. and 100° C. with an uninterrupted circulation, maintaining the lactoserum at this temperature for between 10 and 30 minutes, acidifying to an acid pH value between 4.4 and 4.9, preferably between 4.5 and 4.7, maintaining the lactoserum under these temperatures and acid pH conditions for a time to allow the proteins to precipitate, and cooling the serum down to a temperature between 60° C. and 20° C. with the object of separating the precipitated proteins by a continuous extraction process.

According to a second feature of the invention and in order to maintain continuity in the operations until the desired final product is obtained, the separation is carried out by centrifuging, which also ensures that the serum from which the proteins have been removed is removed continuously. Compared with the discontinuous extraction processes described in the patents mentioned above, which require a number of static operations, the present process enables a better and more constant result to be achieved, because it is obtained automatically. The result of the extraction being carried out continuously is also an important technological modifictaion and represents a considerable simplification in the installation and control of the operation.

The invention also provides the proteins which are obtained by the process described. These are obtained as stable, homogenous and concentrated suspensions of very fine particles of highly hydrated lactalbumin and lactoglobulin, this suspension having a viscosity which is between 20 and 40 centipoises at 10° C., and as a total dry solids content which is between 10% and 30%, preferably at least equal to 16% (which corresponds to the presence of at least 100 g. of pure and dry proteins per kilo of product) for use in cheese-making.

The particles in such a suspension are, at most, 1 micron across.

This product has a characteristic physical structure which is a result of the method by which it is obtained. This is essential to the success of the incorporation of the lactoserum proteins into milk for cheese-making, to increase the yield of the cheese or to dry them by atomisation or spraying.

These characteristics can be modified to meet the needs of other applications.

The following table gives by way of example (in percentages by weight) the composition of a serum, respectively before ("before" column) and after ("after" column) carrying out the process of the invention.

|  | Before | After |
|---|---|---|
| Moisture | 93.66 | 94.41 |
| Dry solids | 6.34 | 5.59 |
| Ash | 0.54 | 0.53 |
| Lactose | 4.36 | 4.20 |
| Casein | 0.00 | 0.00 |
| Albumin | 0.535 | 0.042 |
| Non-protein nitrogen | 0.053 | 0.053 |

This table shows that it is possible by the process to extract $$\frac{0.535 - 0.042}{0.535}$$

i.e. more than 92%, of the soluble proteins (albumin) from the serum.

Analyses carried out in other cases show that this percentage can be as high as 94%.

There will now be described as an example one preferred method of carrying out the process according to the invention, by reference to the single figure of the accompanying drawing. This drawing illustrates in diagrammatic form an installation in which the process can be carried out.

The lactoserum from the manufacture of cheese is cleanly collected as the separation is carried out, and is cooled to +6°/+8° C. and stored in a stainless steel storage tank 1.

This serum, which has not been subjected to lactic fermentation after its production is then subjected in an uninterrupted flow to the following treatments:

(a) Adjustment of the pH to 6.25;
(b) Preheating to 70° C. in a plate-type heat exchanger 2;
(c) Final heating to 95°–96° C. by direct steam injection at 3, controlled by a regulating valve 4;
(d) Holding while being stirred for 20–25 minutes in a heat-insulated tank 5, and while passing through continuously;
(e) Continuous acidification to pH 4.5–4.6 using 20% pure hydrochloric acid being injected by means of a small proportioning pump 6;
(f) Continuous holding at 96° C. and at pH 4.5-4.6 in a pipe 7 of appropriate volume for a period between 10 and 100 seconds, preferably about 75 seconds;
(g) Continuous cooling to 40° C. of the serum containing the insolubilised protein in a plate-type heat exchanger 8;
(h) Continuous centrifugal extraction in a separator 9.

The apparatus starts with a mixture of serum and protein and continuously produces, a protein suspension 10 of which the total dry solids content is equal to 16%, and also the protein-free serum 11.

The temperatures and the pH values at the various stages of the treatment are controlled and recorded using suitable equipment, which can be incorporated into temperature and pH control arrangements.

The protein suspension is then incorporated into milk for the manufacture of cheese.

If the protein suspension which is obtained is not used at once, this is cooled to a low temperature before being stored or transported.

The serum, freed from protein, possibly after concentration, is used for the manufacture of cattle feeding stuffs, for the extraction of lactose or for drying or for other purposes.

In modifications of the embodiment of the process as described previously concentrated serums may be used, the pH may be adjusted to a value other than 4.6 and the centrifugal extraction may be maintained at a temperature other than 40 C.

What is claimed is:

1. A continuous process for the insolubilisation of proteins of lactoserum, comprising carrying out the following steps continuously:

adjusting the pH of the lactoserum to a value between 6.2 and 6.4, then heating the lactoserum to a temperature between 90° C. and 100° C., and maintaining the lactoserum at this temperature for between 10 and 30 minutes while continuously circulating the lactoserum, thereafter acidifying the lactoserum to give it a pH value between 4.4 and 4.9, and maintaining it at this pH value and at a temperature between 90° C. and 100° C. for a period between 10 and 100 seconds to allow the proteins to precipitate, cooling the serum solution containing the precipitated proteins to a temperature between 60° C., and 20° C. while continuously circulating the solution and maintaining its pH value between 4.4 and 4.9, and centrifuging the serum solutions to separate the proteins.

2. A process according to claim 1 wherein the pH value, which must be between 6.2 and 6.4, is maintained at 6.25.

3. A process according to claim 1 wherein the temperature which must be between 90 and 100° C., is maintained at 95–96° C.

4. A process according to claim 1, wherein the serum is brought to the required temperature between 90° C. and 100° C. by preheating to about 70° C. in a plate-type heat exchanger and then by heating it to the required temperature by direct steam injection.

5. A process according to claim 1, wherein the period during which the lactoserum is maintained at a temperature between 90 and 100° C. and which must be between 10 and 30 minutes, is regulated to 20–25 minutes.

6. A process according to claim 1, wherein the serum is maintained at the required temperature between 90 and 100° C. and for a period which is between 10 and 30 minutes by agitating the serum in a heat-insulating chamber through which it passes continuously.

7. A process according to claim 1, wherein the pH value, which must be between 4.4 and 4.9 is maintained between 4.5–4.7.

8. A process according to claim 1, wherein the serum, after acidification, is kept at the required temperature and for the required time by causing it to pass through a conduit of appropriate volume.

9. A process according to claim 1, wherein the said period of time for precipitating the proteins is 75 seconds.

10. A process according to claim 1, wherein the cooling temperature is regulated at approximately 40° C.

11. A process according to claim 1, wherein the serum is continuously cooled by causing it to pass through a heat exchanger.

References Cited

UNITED STATES PATENTS

| | | | |
|---|---|---|---|
| 2,497,420 | 2/1950 | Scott et al. | 99—57 X |
| 2,507,480 | 5/1950 | McDonald et al. | 99—116 |
| 2,602,746 | 7/1952 | Meade | 99—57 X |
| 3,066,133 | 11/1962 | Pinckney | 99—57 X |

LIONEL M. SHAPIRO, Primary Examiner

D. M. NAFF, Assistant Examiner

U.S. Cl. X.R.

99—57, 116; 260—112 R